Dec. 27, 1960  J. F. CARPENTER  2,966,023
DISTRIBUTOR ATTACHMENT FOR A LAWN MOWER
Filed July 13, 1959  2 Sheets-Sheet 2
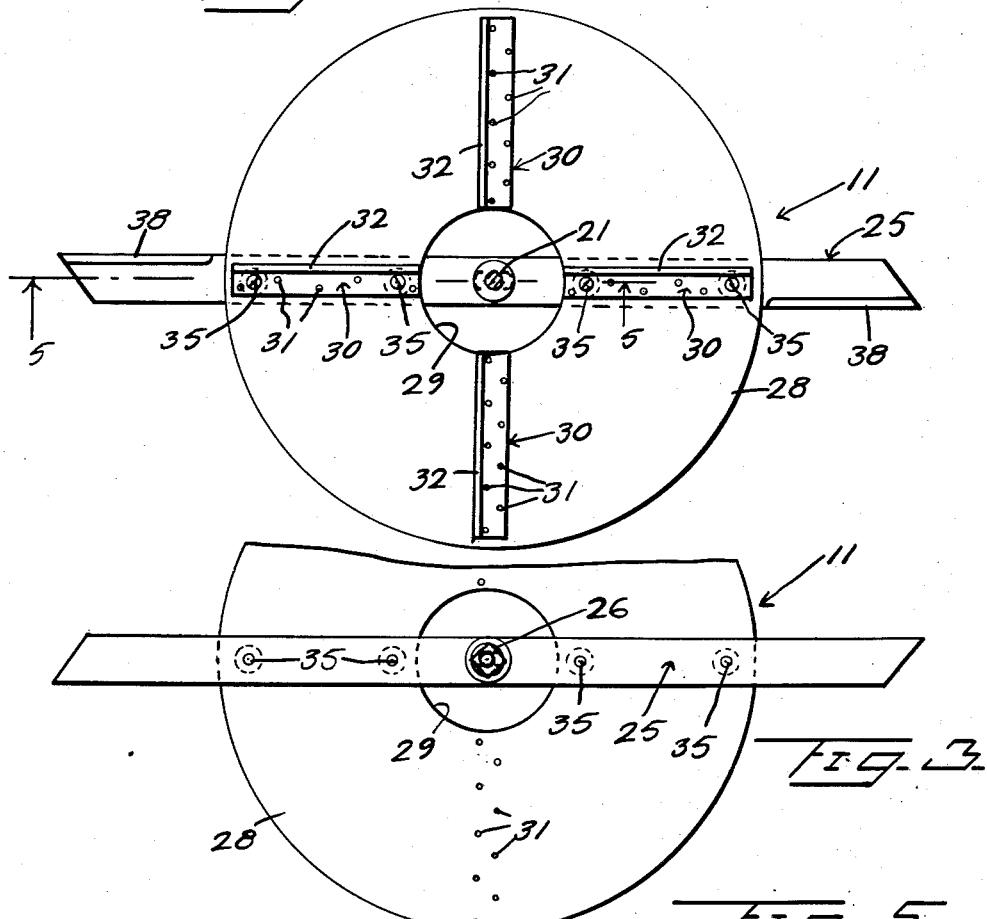
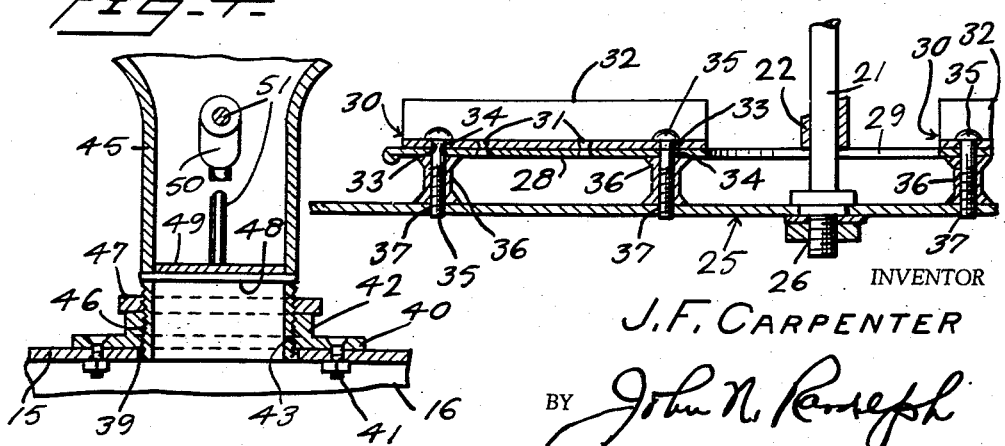
INVENTOR
J. F. CARPENTER
BY John N. Randolph
ATTORNEY United States Patent Office 2,966,023
Patented Dec. 27, 1960

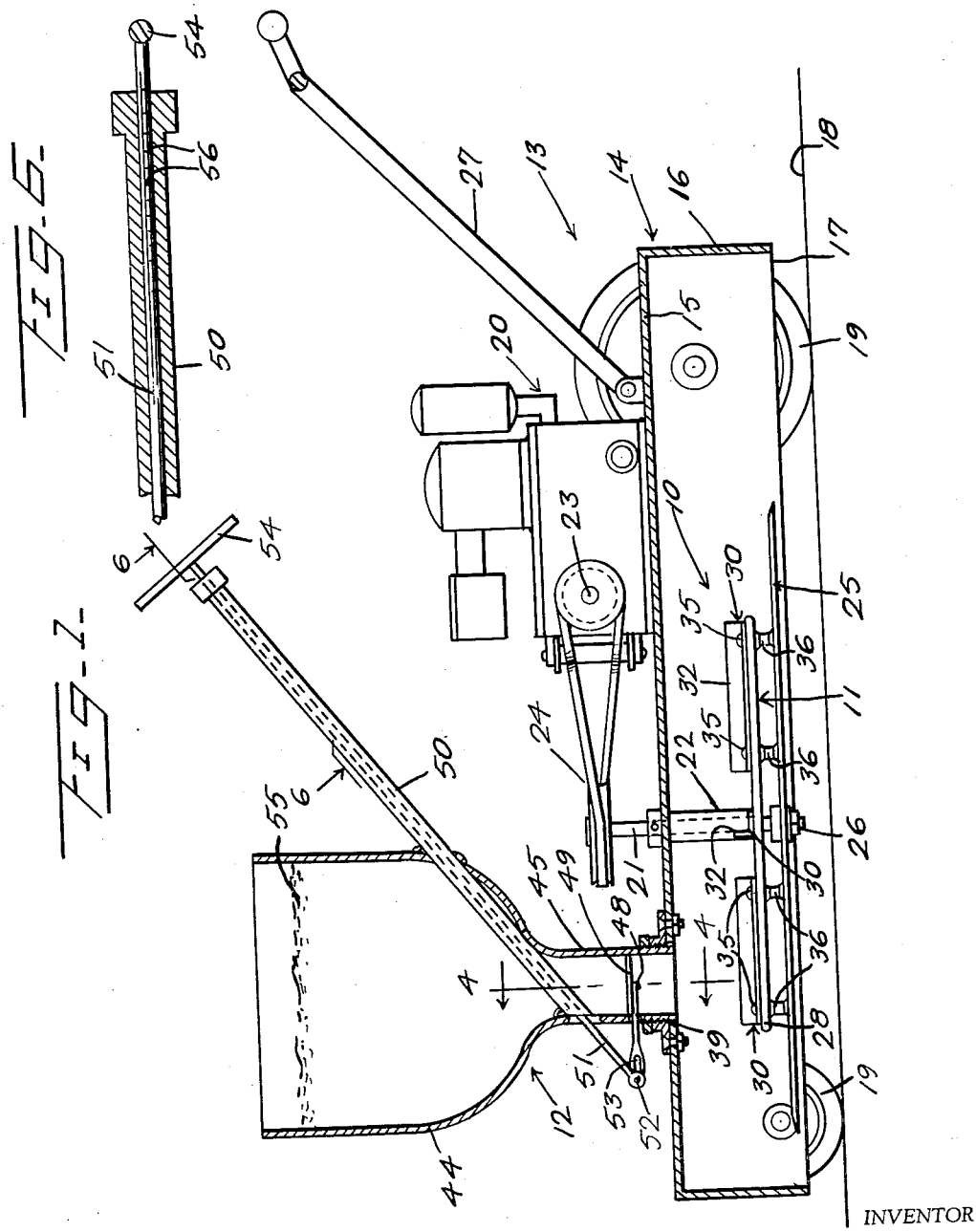

2,966,023
DISTRIBUTOR ATTACHMENT FOR A LAWN MOWER

Jacob F. Carpenter, 22 W. Vining St., Winter Garden, Fla.

Filed July 13, 1959, Ser. No. 826,607

7 Claims. (Cl. 56—25.4)

This invention relates to a distributor attachment of extremely simple construction which may be readily attached to a conventional rotary type lawn mower for distributing a dry material such as fertilizers, various chemicals, lime, grass seed or the like, or a combination of certain of such dry, pulverized or finely divided materials.

More particularly, it is an aim of the present invention to provide a distributor attachment which can be quickly or easily applied to or removed from a conventional lawn mower of the rotary blade type, and which will function to uniformly and evenly distribute the material during the operation of the lawn mower for cutting grass, and whereby the revolving blade of the mower will assist in beating the material or materials being spread into the grass or onto the ground.

Still a further object of the invention is to provide an attachment by means of which distribution of dry material beneficial to the growth of grass or the improvement of the soil or for the killing of weeds or the like, may be evenly distributed as the grass is being cut and without requiring a separate operation.

Still another object of the invention is to provide a distributor attachment wherein the distributed material will evenly cover the area over which the lawn mower is moving to effect a substantial uniform distribution over the entire area of a lawn.

Various other objects and advantages of the invention will hereinafter become more fully apparent from the following description of the drawings, illustrating a presently preferred embodiment thereof, and wherein:

Figure 1 is a longitudinal sectional view, partly in side elevation, showing the distributor attachment applied to a rotary type lawn mower;

Figure 2 is a top plan view, partly in horizontal section and on a somewhat enlarged scale, showing the cutting blade of the mower and the distributor member mounted thereon;

Figure 3 is a fragmentary bottom plan view of the same;

Figure 4 is an enlarged fragmentary vertical sectional view, taken substantially along a plane as indicated by the line 4—4 of Figure 1;

Figure 5 is an enlarged fragmentary diametrical sectional view, taken substantially along a plane as indicated by the line 5—5 of Figure 2, and Figure 6 is an enlarged fragmentary sectional view taken substantially along the line 6—6 of Figure 1.

Referring more specifically to the drawings, the distributor attachment, comprising the invention, is designated generally 10 and broadly includes a distributor unit 11 and a hopper 12.

The attachment 10 is adapted to be mounted on a conventional rotary type lawn mower 13 the frame of which comprises a downwardly opening housing 14 having a top wall 15 and depending side and end walls forming a surrounding skirt 16. The bottom edge 17 of the skirt 16 defines the open bottom of the housing 14 and is disposed above and adjacent the ground level 18, being supported by the conventional ground wheels 19 of the lawn mower, at a desired elevation. A power source 20, such as a gasoline engine, is supported on and secured to the housing top wall 15. A shaft 21 is supported and journaled in a bearing 22, which is in turn supported by the top wall 15. The rotary driven shaft 23 of the power source 20 is connected by a belt and pulley drive 24 to the shaft 21 above the bearing 22 and the top wall 15, so that said shaft 21 will be driven by the power source 20. A conventional rotary type cutting blade 25 is secured intermediate of its ends by fastening means 26 to the lower end of the shaft 21 beneath the bearing 22, so that the blade 25 is supported by the shaft 21 for rotation therewith within the housing 14 and is positioned preferably slightly above the level of the bottom edge 17 of the apron 16, as seen in Figure 1. The lawn mower 13 may be manually propelled and guided in a conventional manner by a conventional handle 27 which is secured to a rear portion of the housing 14 and which extends upwardly and rearwardly from the rear end of said housing. However, the lawn mower may be self-propelled, and as the description proceeds, it will be understood that the distributor attachment 10 is adapted to be mounted on substantially any lawn mower having a rotary type blade. Accordingly, the parts 13 to 27 constitute no part of the present invention but have merely been shown and briefly described to illustrate the application and use of the distributor attachment 10.

The distributor unit 11 comprises a circular plate 28, as best seen in Figures 2 and 3, having a central opening 29. A plurality of elongated angle bars 30 are mounted on and secured to the upper side of the plate 28, between its periphery and the opening 29, said bars 30 being disposed substantially radially of the plate and each including a side resting on the plate and secured thereto by rivets or welding, as seen at 31. Each of the bars 30 is also provided with an upstanding side or flange 32, which is disposed substantially perpendicular to the plane of the plate 28. Two of the bars 30, which are disposed in alignment with one another, have openings 33 in the bottom flanges thereof which align with corresponding openings 34 of the plate 28. The aligned openings 33 and 34 turnably receive bolts 35 which also extend loosely through spacing elements 36. The spacing elements 36, which may be spool shaped, as best seen in Figure 5, are disposed between the underside of the plate 28 and the cutting blade 25, and the lower ends of the bolts 35 threadedly engage in openings 37 of the blade 25 for securing the plate 28 to said blade 25 and so that the plate 28 is disposed above and spaced from the blade and centrally around the shaft 21. The end portions of the blade 25, provided with the cutting edges 38, are disposed beyond the periphery of the plate 28, as seen in Figure 2.

The top wall 15 of the housing, at a point spaced from the shaft 21 and preferably remote from the power source 20, is provided with an opening 39 which is disposed directly above a part of the plate 28, as best seen in Figure 1. An annular plate 40, as best seen in Figure 4, is secured to the upper side of the wall 15 around the opening 39 by fastenings 41 and has a centrally disposed upstanding boss 42 which is internally threaded and which extends through the plate 40 and has an internal diameter slightly smaller than the diameter of the opening 39 and with which said threaded bore 43 aligns.

A hopper 44 has a lower end defined by a restricted discharge neck 45, the lower part of which is externally threaded, as seen at 46, to threadedly engage in the threaded bore 43 and to preferably extend through the opening 39. A jamb nut 47 is threadedly mounted on the threaded portion 46 and is tightened down against the upper end of the boss 42 for securing the hopper neck immovably in said boss and so that the hopper 44 will be suported securely on the housing top wall 15.

A shaft 48 is journaled in and extends transversely through the neck 45, above its threaded portion 46, and a butterfly type valve 49 is fixed to said shaft 48 and is disposed for rocking movement in the neck 45. A guide tube or sleeve 50 is supported at an incline by attachment to the hopper 44 and an actuating rod 51 extends through and has a close fitting sliding engagement in the tube 50. The lower end of the rod 51 protrudes from the lower end of the tube 50 and has its terminal pivotally connected by a pivot element 52 to one end of an arm 53, the other end of which is fixed to and extends laterally from the shaft 48. The other end of the rod 51, which protrudes from the upper end of the tube 50, is provided with a handle 54. From the closed position of the valve 49, as seen in Figures 1 and 4, said valve can be moved to an open position by an upward and rearward pull on the handle 54 to effect an upward swinging movement of the arm 53 for rocking the shaft 48 and valve 49. The extent that the valve 49 is opened will determine the rate at which the fertilizer, chemical, seed or other fluent material 55, contained within the hopper 44, will be discharged through the neck 45 onto the plate 28. The upper portion of the rod 51 may be provided with spaced graduations or markings 56, as seen in Figure 6, for accurately adjusting the valve 49 to regulate the rate of discharge of the material 55, so that a given quantity of the material will be discharged during a predetermined time interval of operation of the lawn mower 13.

From the foregoing it will be readily apparent that the lawn mower 13 can be operated in a conventional manner for cutting grass and with the distributor unit 10 applied thereto. Assuming that the hopper 44 contains the material 55 to be spread and that the valve 49 is opened to a desired extent, as the lawn mower is propelled in a conventional manner for cutting the grass, the material 55 will be dispensed at a uniform rate from the lower end of the neck 45 onto the upper side of the distributor plate 28 which will be revolving at the same speed as the cutting blade 25 for distributing the material 55. The material 55 will be thrown by the flanges 32 in all directions within the housing 14. As the plate 28 is disposed substantially above the level of the bottom edges of the apron 16, all of the material will be discharged onto the ground 18 within the area over which the housing 14 is disposed. Thus, the distributor attachment 10 will substantially uniformly distribute the material 55 onto a strip of ground corresponding to the width of the housing 14 as the mower 13 is advanced from right to left of Figure 1. Consequently, it will be readily apparent that the distributor attachment 10 can be efficiently utilized for applying any fluent material substantially uniformly to a lawn as the lawn is being mowed. The operation of the blade 25 and the plate 28 will tend to beat the material into the turf. Normal vibration of the lawn mower 13 will maintain the material 55 adequately agitated within the hopper 44 to maintain a substantial uniform discharge of the material.

It will be readily obvious that the hopper 44 and the parts attached thereto may be readily removed from the boss 42 and a threaded plug or closure, not shown, may be applied to the opening 43, if desired, for sealing said opening when the distributor 10 is not employed. The fastening means 26 may be readily removed for detaching the blade 25 so that the distributor unit 11 may be removed therefrom, by removal of the bolts 35. However, the unit 11 may be left applied to the blade 25 when the distributor 10 is not being employed and will not interfere with the operation of said blade, and the hopper 44 may be left applied to the lawn mower 13, when the distributor unit 10 is not being utilized.

Various other modifications and changes are contemplated and may be resorted to, without departing from the function or scope of the invention as hereinafter defined by the appended claims.

I claim as my invention:

1. A distributor attachment for a lawn mower, comprising, in combination with a lawn mower having a downwardly opening housing and a rotary driven mower blade disposed for rotation within said housing, a circular distributor plate having a central opening, means securing said plate to the blade, said means positioning the plate within the housing above and spaced from the blade and substantially concentric about the axis of rotation of the blade, a hopper adapted to contain a dry finely divided fluent material, and means detachably mounting said hopper on a part of the housing and above a portion of said distributor plate, said hopper having a downwardly extending discharge neck defining the lower end thereof, said neck opening into the housing above a portion of the plate.

2. A distributor attachment as in claim 1, a valve disposed within said hopper neck, a manually actuated means supported by said hopper and connected to the valve for adjustably positioning the valve in the neck for regulating the rate of discharge of the fluent material from the hopper onto the distributor plate.

3. A distributor attachment as in claim 1, and a plurality of upstanding vanes secured to the upper side of said plate and extending substantially radially thereof for broadcasting the material, discharged from the hopper onto the plate, in all directions within the housing.

4. A distributor attachment as in claim 1, said first mentioned means comprising spacer elements disposed between portions of the plate and portions of said blade, and fastening elements extending through said plate and spacer elements and detachably secured to the blade for detachably mounting the plate on the blade.

5. A distributor attachment as in claim 1, said blade being of a length substantially greater than the diameter of the plate and having exposed end portions provided with cutting edges.

6. A distributor attachment as in claim 1, said last mentioned means comprising an annular boss secured to and disposed on an upper part of the housing, said housing part having an opening registering with the opening of said boss, and means detachably securing the discharge end of the hopper neck in said boss and housing opening.

7. In combination with a downwardly opening lawn mower housing and a rotary driven cutting blade mounted for rotation within said housing; a distributor attachment comprising an annular plate, means securing said plate to the blade and positioning the plate within the housing above and spaced from the blade and substantially concentrically around the axis of rotation of the blade, a hopper adapted to contain a dry fluent material and having a restricted lower discharge end opening into the housing above a part of the distributor plate, and means detachably mounting said hopper on the housing.

References Cited in the file of this patent

UNITED STATES PATENTS

| | | |
|---|---|---|
| 2,639,571 | Kelly | May 26, 1953 |
| 2,742,751 | Laughlin | Apr. 24, 1956 |
| 2,792,970 | Gaiman | May 21, 1957 |
| 2,847,224 | Stout | Aug. 12, 1958 |
| 2,861,611 | Consider | Nov. 25, 1958 |